(12) United States Patent
Lee et al.

(10) Patent No.: US 7,341,664 B2
(45) Date of Patent: Mar. 11, 2008

(54) METHOD FOR FORMING AN IN SITU GROUNDWATER FILTER

(75) Inventors: Ming-Kuo Lee, Auburn, AL (US);
James A. Saunders, Auburn, AL (US);
Samuel H. Nichols, III, Auburn, AL (US)

(73) Assignee: Auburn University, Auburn, AL (US)

( * ) Notice: Subject to any disclaimer, the term of this patent is extended or adjusted under 35 U.S.C. 154(b) by 409 days.

(21) Appl. No.: 10/865,572

(22) Filed: Jun. 10, 2004

(65) Prior Publication Data

US 2004/0222151 A1 Nov. 11, 2004

Related U.S. Application Data

(63) Continuation-in-part of application No. PCT/US02/39541, filed on Dec. 10, 2002.

(60) Provisional application No. 60/339,211, filed on Dec. 10, 2001.

(51) Int. Cl.
*C02F 3/00* (2006.01)
(52) U.S. Cl. ..................... 210/610; 210/611
(58) Field of Classification Search ............. 210/610, 210/611
See application file for complete search history.

(56) References Cited

U.S. PATENT DOCUMENTS

| | | | |
|---|---|---|---|
| 5,133,625 A * | 7/1992 | Albergo et al. ............. 405/263 |
| 5,554,290 A | 9/1996 | Suthersan | |
| 5,710,361 A | 1/1998 | Harrington et al. | |
| 5,833,855 A | 11/1998 | Saunders | |
| 6,001,252 A | 12/1999 | Rice et al. | |
| 6,165,356 A * | 12/2000 | Carman et al. ............. 210/150 |
| 6,322,700 B1 | 11/2001 | Suthersan | |

OTHER PUBLICATIONS

"Microbes to Minerals," http://www.science.uwaterloo.ca/earth/waton/microbes.html, date unknown, pp. 1-3.
U.S. Environmental Protection Agency, "Exposure Assessment Models," http://epa.gov/ceampubl/mmedia/minteq/, date unknown, pp. 1-2.
Environmental Research Software, "How can Chemical Equilibrium Help You?," http://www.mineql.com/homepage.html, date unknown, pp. 1-7.

* cited by examiner

*Primary Examiner*—Chester T. Barry
(74) *Attorney, Agent, or Firm*—Haverstock & Owens LLP

(57) ABSTRACT

A method and system for forming an in situ subsurface filter in a contaminated aquifer and for removing contaminants from groundwater drawn from a contaminated aquifer. The filter is produced in situ by injecting an aqueous solution comprising bacteria-stimulating chemical components through a well to bioactively generate a subsurface mineral filtering zone surrounding the well. As water is subsequently drawn through the well, contaminants are removed from the water as it passes through the filtering zone.

53 Claims, 5 Drawing Sheets

METHOD FOR FORMING AN IN SITU GROUNDWATER FILTER

CROSS-REFERENCE TO RELATED APPLICATIONS

This application claims the benefit of U.S. Provisional Patent Application Ser. No. 60/339,211, filed Dec. 10, 2001, and is a continuation-in-part of PCT/US02/39541, filed Dec. 10, 2002, which are hereby incorporated herein by reference in their entireties for all purposes.

FIELD OF THE INVENTION

The present invention relates generally to the field of water treatment and, more particularly, to an in situ filter for removing contaminants from groundwater.

BACKGROUND OF THE INVENTION

In many shallow aquifers, groundwater has been contaminated by anthropogenic (man-made) sources and/or natural processes (e.g., weathering, sorption/desorption, and biogeochemical reactions) to the point where the water from the aquifer is unsuitable for safe and healthy human consumption. Water from contaminated aquifers may even be unsuitable for agricultural uses such as watering livestock or irrigation, or for many industrial purposes. In many countries, a significant portion of the population (estimated to be greater than 100 million people world-wide) have no viable alternative to using this contaminated water for human consumption and for livestock, leading to potentially adverse living conditions and negative health effects.

The demand for clean water is only expected to increase in coming years due to global population increases. Thus, new technologies are required to help remove contaminants from available groundwater supplies. In developed countries, concerns about water quality have led to increased usage of bottled water from uncontaminated or filtered/purified sources for drinking purposes. Technologies have also been developed to remove even trace amounts of dissolved contaminants from water (e.g., water filters, etc.). However, in developing countries the cost of known active water-treatment technologies for groundwater is often prohibitive, often leading to significant adverse public health consequences from the consumption of untreated water.

Particular types of groundwater contaminants that have been found to be of common concern in many areas include toxic heavy metals, such as lead, cadmium, silver, hexavalent chromium, uranium, mercury etc.; toxic metalloids, such as arsenic and selenium; and halogenated hydrocarbons, such as perchloroethene (PCE) and trichloroethene (TCE). Cost-effective remediation technologies to remove these and other contaminants from groundwater drawn from aquifers through wells, to the point that the waters become clean enough for an intended use (e.g., drinking, industrial, agricultural use, etc.), would be highly desirable.

Thus, it can be seen that needs exist for improved methods and systems for processing groundwater to remove contaminants. It is to the provision of improved methods and systems meeting these and other needs that the present invention is primarily directed.

SUMMARY OF THE INVENTION

The present invention includes a method of treating contaminated groundwater comprising providing a composition capable of stimulating target microorganisms to produce biominerals, wherein at least a portion of the biominerals are capable of removing a contaminant from groundwater. An effective amount of the composition is injected at an effective rate at a first location into a first subsurface region. The composition is contacted with the target microorganisms under conditions effective for the microorganisms to produce the biominerals in a second subsurface region. The groundwater comprising a contaminant is moved through the biomineral-containing second subsurface region at a rate effective for the biominerals to remove at least a portion of the contaminants from the groundwater.

Briefly described, in example embodiments of the present invention, wells are used to deliver nutrients and/or other chemical constituents to groundwater aquifers in situ to stimulate indigenous sulfate-reducing bacteria (SRB) and/or metal-oxidizing bacteria (MOB) to precipitate solid mineral phases (crystalline and amorphous) within the aquifer matrix. These "reduced" and "oxidized" mineral phases preferably then remove dissolved or suspended contaminants from the groundwater by the processes of adsorption, absorption (herein referred to as "sorption"), co-precipitation, or by a chemical reaction with mineral surfaces. Contaminants treatable by example methods and systems of the present invention include, without limitation, toxic heavy metals, such as lead, cadmium, silver, hexavalent chromium, uranium, mercury, etc.; toxic metalloids, such as arsenic and selenium; and halogenated hydrocarbons, such as PCE and TCE, which are reductively dehalogenated, resulting in more easily biodegraded interim compounds.

In example embodiments, a solution comprising at least one bacteria-stimulating component, such as nutrients and/or chemical compounds selected to stimulate a target bacteria, are preferably dissolved in water and injected into groundwater through one or more wells drawing on an aquifer or a portion thereof. This induces the formation of a "groundwater mound" centered about the well leading to radial flow in the aquifer of the dissolved constituents away from the well. Indigenous or non-indigenous bacteria are thereby stimulated to precipitate minerals within in a finite volume around the well that form an in situ groundwater filter for removing contaminants from groundwater subsequently drawn through the well. The bacteria may also remove some contaminants from the groundwater in the aquifer surrounding the well. Preferably, "near-field" groundwater initially present in the in situ groundwater filter zone is removed by pumping out of the well and is treated for use and/or disposal. Continued pumping from the well then draws contaminated groundwater from portions of the aquifer outside of the original in situ groundwater filter volume, and the in situ filter then removes contaminants from these "far-field" waters.

Depending on initial aquifer mineralogy and groundwater chemistry, "oxidized" minerals formed by stimulation of MOB (such as iron and manganese oxides or oxyhydroxides) may be selected as the targeted minerals for remediation. Alternatively or additionally, "reduced" minerals, such as metal sulfides and carbonates, may be formed by stimulating SRB.

One envisioned application of the technology is to provide a long-term (possibly subject to periodic "recharges") subsurface mineral filter to clean groundwater to levels suitable for human consumption, agricultural uses, and/or industrial applications. Thus, the method and system of the present invention can produce new sources of clean usable water extracted through wells drawing on contaminated aquifers, as opposed to merely remediating a finite near-field volume of groundwater to meet a regulatory concern.

In one aspect, the invention is a method of treating contaminated subsurface water to provide usable water. The method preferably includes injecting a solution comprising at least one bacteria-stimulating component into a subsurface region, introducing the solution comprising at least one bacteria-stimulating component to bacteria to produce biomineral precipitate within the subsurface region, and drawing water through the subsurface region in contact with the biomineral precipitate.

In another aspect, the invention is a method of forming a subsurface mineral filtering zone within an aquifer. The method preferably includes injecting a bacteria-stimulating solution through a well into a portion of the aquifer, and introducing the bacteria-stimulating solution to bacteria to generate production of a biomineral precipitate within a portion of the aquifer.

In yet another aspect, the invention is a system for treatment of contaminated water. The system preferably includes a subsurface mineral filtering zone within an aquifer. The subsurface mineral filtering zone preferably includes a bacterially-generated biomineral precipitate. The system preferably also includes a well for drawing contaminated water from the aquifer through the subsurface mineral filtering zone to remove contaminants from the contaminated water.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGURES

DETAILED DESCRIPTION

Figure 1:
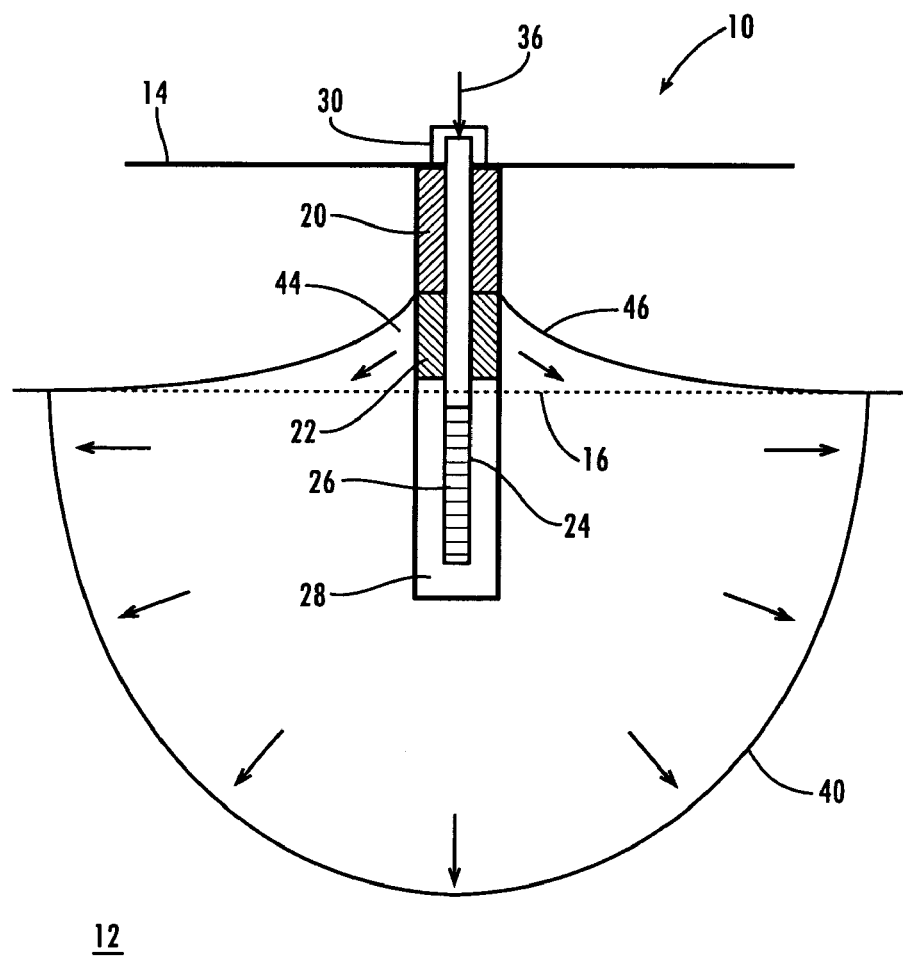
FIG. 1 shows a well and subsurface in situ groundwater filter region, according to an example form of the present invention.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention.

In addition, as used in the specification including the appended claims, the singular forms "a," "an," and "the" include the plural, plural forms include the singular, and reference to a particular numerical value includes at least that particular value, unless the context clearly dictates otherwise.

When values are expressed as approximations, by use of the antecedent "about," "approximately," or the like, it will be understood that the particular value forms another embodiment.

Furthermore, any methods described herein are not intended to be limited to the sequence of steps described but can be carried out in other sequences, unless expressly stated otherwise herein.

It is also to be understood that certain elements and features of the system and method described herein have utility separately and in various sub-combinations, without reference to the other elements and features described, and that the present invention includes the described elements and features of the system and method separately as well as in their various combinations and sub-combinations.

The invention includes a method of treating contaminated groundwater comprising a) providing a composition capable of stimulating target microorganisms to produce biominerals, wherein at least a portion of the biominerals are capable of removing a contaminant from groundwater;

b) injecting an effective amount of the composition of a) at an effective rate at a first location into a first subsurface region;

c) contacting the composition of a) with the target microorganisms under conditions effective for the microorganisms to produce the biominerals in a second subsurface region; and d) moving groundwater comprising a contaminant through the biomineral-containing second subsurface region at a rate effective for the biominerals to remove at least a portion of the contaminants from the groundwater.

The well site (point of injection/first subsurface region) is preferably characterized and sampled prior to injection and filtering. One or more groundwater samples preferably are collected at the well site to define the initial chemical and, optionally, the initial microbiological conditions. A reconnaissance hydrogeologic investigation is preferably also conducted, typically including but not necessarily limited to the following: 1) an inventory of existing active and inactive water wells, springs, etc. in the immediate area; 2) collection of water table data or equipotentiometric surface data; and 3) compilation of area geology and likely expected water-flow conditions.

Groundwater samples are preferably withdrawn from the water well(s) of interest, typically utilizing a motorized centrifugal pump or other pumping means. Water samples are preferably collected and stored in clean bottles and transported to a certified laboratory to measure major, minor, and trace elements, including potential contaminants and bacterial nutrients (such phosphate and nitrate) using accepted and/or standard procedures. Alternatively, some defined parameters of interest are measured in the field using field kits after the general groundwater chemical make-up in an area has been established previously.

Methods of characterization of a site are known in the art and one of skill in the art can determine appropriate testing and characterization to be performed.

Other locations and subsurface regions can be characterized chemically and/or microbiologically as needed to determine differences across a site. The number of and location of areas to be characterized can be determined by one of skill in the art.

Providing a Composition for Stimulating Microorganisms

A method of the invention comprises providing a composition capable of stimulating target microorganisms to produce biominerals, wherein at least a portion of the biominerals are capable of removing a contaminant from groundwater.

Taking into consideration the site hydrogeology and groundwater geochemistry established at the site, an injection solution (composition) is preferably formulated to stimulate targeted microorganism (e.g., bacterial) populations at the site. The injection solution preferably comprises one or more water-soluble constituents that are delivered to the aquifer to stimulate indigenous bacteria to produce the desired "biominerals," or biogenic minerals. The solution is preferably injected into a water well 10 through the cap 30 as indicated by arrow 36 in FIG. 1.

One of skill in the art can determine the formulation (choice of ingredients, amount of each ingredient, etc.) for the injection solution. For example, formulating can comprise i) determining a first formulation capable of supporting metabolism of the target microorganisms but emphasizing desired production of minerals as opposed to growth and ii) adjusting and/or adding ingredients in the first formulation to account for the chemistry of the region. Literature information regarding particular microorganims, lab testing with site samples and various formulations, and other sources of information can be used in determining a formulation for stimulating the target microorganisms.

If repeated injections are to be performed, the formulation can be altered over time to account for changes in chemistry/microbiology that occur from, e.g., previous injections, microbial activity, and groundwater changes.

The injection solution 36 can include, for example, electron acceptors (e.g., sulfate), organic carbon (electron donors), soluble iron and manganese salts, bacteria, and/or nutrients (nitrogen and phosphorus).

Examples for formulating a composition are shown in Table 1.

TABLE 1

Compositions of Reactive Materials Used to Stimulate SRB or MOB in Remediation of Metals-Contaminated Groundwater.

| Bacteria type | Conditions | Materials/Mixtures Added |
|---|---|---|
| SRB | Anaerobic* | 1. Electronic donors (organic carbon sources) Mixing ratios: 100 gallons of water with 10-15 pounds of soluble organic carbon compounds such as sucrose, molasses, acetate, methanol, ethanol. <br> 2. Electronic acceptors (soluble sulfate salts) Mixing ratios: Adding ferrous sulfate to reach 1:1 S/C ratios in groundwater for optimum bacterial sulfate reduction. Less amounts of sulfate salts are needed if groundwater already contains some dissolved sulfate. In Fe-depleted groundwater, adding Fe(II)-containing solids or solutions (FeCl$_2$) to maintain 1:1 S/Fe ratio for optimum precipitation of insoluble iron sulfide (pyrite) biominerals. <br> 3. Nutrients (nitrogen and phosphorus) Mixing ratios: 100 gallons of water with 1-3 pounds of diammonium phosphate (NH$_4$HPO$_4$) |
| MOB | Aerobic** | 1. Electronic donors (Fe— or Mn-bearing solids or solutions Mixing ratios: the molality of Fe— or |

TABLE 1-continued

Compositions of Reactive Materials Used to Stimulate SRB or MOB in Remediation of Metals-Contaminated Groundwater.

| Bacteria type | Conditions | Materials/Mixtures Added |
|---|---|---|
| | | Mn-bearing materials added should be approximately equal or slightly less than that of total dissolved metals in a finite volume of contaminated groundwater around the well screen (i.e., volume of contaminated water present with a radial distance from well ≈ 20 × diameter of well casing), assuming 1:1 stoichiometry of mixed solids (e.g., Cr$_{0.5}$Fe$_{0.5}$(OH)$_3$) formed by MOB. Multiple injections with smaller amounts may be needed to avoid well clogging due to precipitation of biominerals. Less amounts of Fe-bearing solids are needed if groundwater already contains some dissolved Fe(II). |

Remediation under anaerobic conditions

Remediating metals-contaminated groundwater under anaerobic conditions can be achieved by adding a mixture of (1) hydrous ferrous sulfate, (2) a carbon electron donor (e.g., sucrose, molasses, methanol, ethanol, etc.), and (3) nutrients (nitrogen and phosphate) through injection wells to stimulate sulfate reducing bacteria (SRB). SRB such as Desulfobacter or Desulfovibrio can oxidize organic carbons and reduce dissolved sulfate to hydrogen sulfide. Sulfate reduction could be stimulated to the point where solid sulfide phases would precipitate, leading to metal removals by co-precipitation in solids. The lack of ferrous iron can limit SRB metabolic efficiency because Fe(II) is present in many of the enzymes and compounds used in electron transfers by SRB. Thus, injection of dissolved Fe(II) into As-contaminated groundwater: 1) insures that iron will be available for SRB metabolism; 2) limits the buildup of potentially toxic levels of H$_2$S; 3) keeps the Fe(II)/H$_2$S ratio high enough to keep As-thio complexes from occurring to any significant extent, and 4) provides both the Fe and S needed for the As-"encapsulating" FeS phases. Thus, this approach can be effective in treating As-contaminated groundwater as the conditions for As-co-precipitation in FeS are optimized.

Remediation under aerobic conditions

Remediating metals-contaminated groundwater under aerobic conditions can be achieved by adding Fe- or Mn-bearing solids or their solutions to stimulate metal-oxidizing bacteria (MOB). Metal-oxidizing bacteria (MOB) (such as Gallionella, *Pseudomonas*) are common in natural aerobic environments and are generally autotrophic. Autotrophic bacteria do not require organic carbon for their metabolism and represent a common component of the subsurface microbial community. MOB can be easily stimulated and turn large amounts of dissolved Fe$^{+2}$ and Mn$^{2+}$ to insoluble Fe(III) and Mn(IV) oxyhydroxides, which serve as in situ groundwater filters to remove dissolved metals from groundwater by adsorption. Fe- or Mn- bearing materials capable of stimulating target MOB include mineral or amorphous forms of fine-grain elemental Fe$^0$, siderite(FeCO$_3$), hematite (Fe$_2$O$_3$), magnetite (Fe$_3$O$_4$), pyrite (FeS$_2$), rhodochrosite (MnCO$_3$), bixbyite (Mn$_2$O$_3$), pyrolusite (MnO$_2$), and Fe-bearing solutions such as FeCl$_2$.

The solution can be made up using groundwater extracted from the site (and the injection well in particular) or using tap water, for example. If non-native water is used, its chemistry should be taken into account when formulating the composition.

The solution can be made up at the location or transported to the site after being made up elsewhere.

Injecting the Composition

A method of the invention comprises injecting an effective amount of a composition capable of stimulating target microorganisms to produce biominerals at an effective rate at a first location into a first subsurface region.

FIG. 1 shows a system for forming an in situ groundwater filter according to an example embodiment of the present invention. A well 10 accesses an aquifer 12 beneath the surface 14 of the earth to draw groundwater initially at a level indicated by broken line 16. The depicted well 10 includes a cement/grout head portion 20, a bentonite seal 22, a steel well casing 24, a well screen 26, and a sand pack base 28. A locking cap 30 preferably caps the head 20 of the well 10. It will be understood by those skilled in the art, however, that the system and method of the present invention are readily adaptable to any of a variety of well and aquifer types. One of skill in the art can determine an appropriate well construction for the desired application.

A finite volume of groundwater surrounding the injection well(s) 10 is preferably treated by the injection solution 36, described above, introduced into the aquifer through the well. This "near-field" treated volume is indicated in FIG. 1 as being bounded by the broken line of plume 40. Water preferably forms a "mound" 44 around the well 10 during the injection process, as indicated by the elevated water level 46 in FIG. 1, and with groundwater extraction pumps turned off, the injected solution will flow outward into the aquifer. Thus, injection will reverse the normal flow direction of groundwater flow to the pumping well. This subsurface in situ groundwater mound 44 drives formation of the active biodegradation and metal attenuation zone 40 generated by injection of the composition into the well.

An effective amount of the composition is injected. An effective amount can be determined by one of skill in the art. An effective amount is sufficient to achieve the desired effect of stimulating the microorganisms to produce minerals. Preferably, this amount will support the microorganisms without excessive growth of the microorganism population and without excessive production of minerals, either of which can produce plugging in the subsurface. Preferably, an effective amount of composition will stimulate the microorganisms to produce an amount of minerals which is sufficient to remove the contaminants to a desired/target level, e.g., drinking/potable water level.

The composition is injected at an effective rate. An effective rate can be determined by one of skill in the art. An effective rate is sufficient to achieve the desired dispersion of the composition. For example, it is preferable that the injection create mounding at the injection site so that dispersion is essentially radial, or at least outward, from the injection site. Too low a rate can, for example, cause the composition to concentrate solely around the injection point. Too high a rate can, for example, create back pressure in the injection system, cause the composition to fill the well and then overflow onto the surface, or move or compact subsurface soil around the injection point.

Amount and rate are preferably chosen so that the microorganisms will produce a mineral-containing subsurface region which will be sufficient in size and location to contact the contaminated groundwater plume/flow. If the mineral-containing region is too shallow or too deep, the contaminated groundwater can miss the mineral-containing area.

The composition is injected at a first location. The location for injection can be determined by one of skill in the art. For example, this location can be downgradient of the contaminated water. The contaminated water can then flow or be drawn through the area affected by the injection. The location can depend on the conductivity of the soil, for example, since the area that can be impacted by a given injection point depends upon the conductivity of the soil, as well as other factors such as pumping rate. The location can, for example, be alternatively within the region of the contaminated water. This location can be the same as or different than the location used for withdrawing water.

Injection can be, for example, on a periodic batch basis or on a continuous basis. Frequency of injection can be determined by one of skill in the art. If the same well is used for withdrawing water, the injection will be periodic while the withdrawal is halted.

Injection can be accomplished using a variety of configurations. One of skill in the art can determine appropriate equipment, configurations, and sizing for achieving the desired injection. One example of equipment for injection is a simple pump and tank with piping or tubing attached to the well.

Contacting the Composition Microorganisms to Produce Biominerals

A method of the invention comprises contacting a composition capable of stimulating target microorganisms to produce biominerals with the target microorganisms under conditions effective for the microorganisms to produce the biominerals in a second subsurface region.

Once injected, the composition may come into contact with the target microorganisms immediately or over time. The composition or microorganisms may move downgradient or be moved by withdrawal of groundwater. The location at which the microorganisms and injected composition come into contact may occur very locally at the point of injection or some distance from the point of injection due to flow of the composition, for example. Therefore, the first subsurface region and the second subsurface region can be the same or different.

The biominerals produced by activity of the indigenous bacteria preferably are very small—for example, on the nanometer scale. These biomineral nanoparticles have a very high surface area and preferably are reactive with targeted contaminants in the groundwater. For example, in one embodiment, aerobic bacteria are stimulated to produce a desired "oxidized" suite of solid amorphous to crystalline oxides, hydroxides, or oxyhydroxides of iron, manganese, and/or other transition metal(s).

In another embodiment, anaerobic bacteria are stimulated to produce "reduced" biominerals including amorphous and crystalline iron-, manganese- (or other transition metal-) sulfide and carbonate minerals or solids. The determination of which bacteria will be stimulated to produce the oxidized or reduced suite of minerals is preferably dependent on the nature of the groundwater chemistry and the potential contaminants present at a particular site.

The injected solution preferably induces indigenous bacteria to precipitate biominerals in the aquifer volume surrounding the well (i.e., in the zone where injection solutions mix with groundwater outward from the well). The biominerals have the capacity to remove groundwater contaminants such as toxic heavy metals and metalloids (such as arsenic and selenium) by sorption on mineral surfaces and also by co-precipitation (contaminants incorporated into the solid mineral phases during continued growth). The stimulation of the indigenous bacterial action optionally also serves to remediate contaminated groundwater within a localized near-field zone surrounding the well, as disclosed for example by U.S. Pat. No. 5,833,855, incorporated herein by reference in its entirety. Thus, groundwater contaminants are preferably removed from aqueous solution and sequestered on or in the solid minerals phases. An example application of the technology is described in greater detail below, based on site geochemical, microbiologic, hydrogeologic conditions, or the nature of the contaminants present.

Metal-oxidizing bacteria (MOB) are common in natural aerobic environments and are generally autotrophic. Autotrophic bacteria do not require organic carbon for their metabolism and represent a common component of the subsurface microbial community. MOB primarily oxidize dissolved iron and manganese and, therefore, are widely distributed in transitional environments, such as streambeds or shallow water-table aquifers where anaerobic, high-iron groundwaters mix with aerobic surface water. MOB can be easily stimulated and turn large amounts of dissolved $Fe+^2$ to insoluble ferric oxyhydroxides, which produce an in situ groundwater filter for removal of dissolved metals from groundwater by sorption. Bacteria are usually strongly attached to metal oxyhydroxides with positively charged surfaces due to electrical attraction. The strong sorption of bacteria into this oxidized mineral filter allows the biogeochemical processes to persist in a finite volume of groundwater filter around the well. The minerals and bacteria that comprise the in situ filter, thus, serve to remove metal contaminants from the migrating groundwater.

Sulfate-reducing bacteria (SRB) are common in both aerobic and anaerobic environments. Many SRB can be easily stimulated by injection of water-soluble nutrients and electronic acceptors. SRB are capable of reducing sulfate to reduced sulfur, usually in the form of hydrogen sulfide. Although the fate of hydrogen sulfides produced by bacteria sulfate reduction is extremely complex, some portion of $H_2S$ can react with dissolved metals (such as Fe, Zn, Pb, etc.) to form insoluble sulfide minerals. The formation of such biogenic minerals can remove sulfur as well as heavy metals from aqueous solutions. Dissolved heavy metals can be removed from groundwater by precipitation or co-precipitation with sulfide minerals or solids. SRB have been used to remediate acid mine drainage because they can grow under acidic conditions and are capable of withstanding pH values as low as 3 for extended periods. The biogenic sulfides and carbonate minerals produced by SRB are very small (typically less than a few nanometers) and, thus, have a very high surface area to facilitate the sorption or co-precipitation of contaminants. Some FeS phases also may serve to dehalogenate certain man-made organic chemicals. Recent studies have shown that anaerobes such as SRB can degrade benzene and chlorinated solvents such as perchloroethene (PCE) and trichloroethene (TCE) by using these organic compounds as electronic donors.

Moving Groundwater through the Biomineral-containing Region

A method of the invention comprises moving groundwater comprising a contaminant through the biomineral-containing second subsurface region at a rate effective for the biominerals to remove at least a portion of the contaminants from the groundwater.

Referring again to the example embodiment, after treatment of the zone surrounding the well 10, as disclosed, to generate the in situ groundwater filter (biomineral-containing region), process water within the near-field filtering zone 40 is preferably removed, as by pumping through the well. The removed water is preferably treated for further use or is disposed of. Further pumping draws groundwater from far-field portions of the aquifer through the filtering zone 40, where the water is treated and contaminants are removed. As this treated water is drawn out of the well 10, it is preferably tested for suitability for its intended use and, if acceptable, stored or delivered for use.

Continued water-quality monitoring is preferably conducted after treatment by the system and method of the present invention in order to track biological activity and subsequently whether biominerals are precipitating contaminants. For example, initial biologic activity may have favorable results on contaminant removal, but continuous pumping of water that was initially outside of the subsurface mineral filter volume will draw that contaminated water into contact with the reactive biominerals in the aquifer volume immediately surrounding the well of interest.

The withdrawing/pumping of water (pumping well/withdrawal point) is at a second location effective to move the groundwater through the mineral-containing second subsurface region. This location can be, for example, downgradient of the contaminated water or within the contaminated water plume. For example, in addition to moving the contaminated groundwater through the filter, the pumping can generally be used to control spread of the contaminated water. The second location may be the same or different from the first location where the composition is injected. One of skill in the art can determine a location effective for withdrawing water to move the groundwater though the filter.

The contaminated groundwater is moved preferably at a rate effective to remove the contaminants. It is preferable that the contaminated groundwater remain in contact with the minerals long enough for at least a portion of the contaminants to be removed. Preferably, the contact is long enough for the contaminants to be removed down to the target levels, e.g., drinking water levels. The kinetics involved in the removal mechanism(s) (e.g., co-precipitation) determine the length of time required to remove the contaminants. Other processes may be simultaneously occurring which also affect the contaminant levels and availability to the minerals, e.g., bioremediation, sorption to the soil or organic matter in the soil, and/or desorption from the soil. These other processes may affect the quantity and rate of contaminant removal from the groundwater. One of skill in the art can determine a rate effective to move the groundwater though the filter to remove a desired amount of contaminant.

The rate for operating a pump, for example, can also be determined by other factors. For example, if a well is pumped faster than the groundwater can recharge the well, the well will be pumped dry, causing pump damage. One of skill in the art can balance these considerations with the time required for contaminant removal.

The groundwater is preferably moved by pumping a well. One of skill in the art can determine a method and apparatus for moving the groundwater through the second subsurface region. For example, if the injection and withdrawal points are the same, the pump used for injection may be reversed and instead used to pump water from the well.

Example Application

An existing monitoring well having metal concentrations and a low pH was selected for treatment according to an example embodiment of the present invention. This well had its own dedicated submersible pump and had been used for monitoring water quality at the site for more than 5 years.

Approximately 825 L of a solution containing 45 kg of sucrose and 2.5 kg of diammonium phosphate (herein called the carbon-nitrate-phosphate or CNP solution) was injected by gravity feed into the monitoring well, which was screened in a shallow sand aquifer.

Within a month, substantial changes in the aquifer geochemical conditions occurred. For example, groundwater pH had increased about 1 log unit and Eh had dropped dramatically (e.g., from aerobic to highly reducing; FIG. 2a), the distinct odor of hydrogen sulfide was present, and there was little doubt that biogenic sulfate reduction had been initiated. Groundwater samples from the well no longer had their typical orange color from the suspended hydrous ferric oxides (HFOs) normal for an aerobic, iron-rich water samples. The principal contaminants Pb (lead) and Cd (cadmium) showed dramatic drops in their concentrations, with lowest dissolved values of 1.5 ppb and 0.5 ppb, respectively (FIG. 2b). Similarly, other chalcophile elements (Cu, Zn) showed similar decreases, consistent with all of these elements forming or co-precipitating in relatively insoluble sulfide phases.

X-ray diffraction analysis of the black precipitate filtered from water samples showed only a diffuse and broad peak at Cu—K$\alpha$-spacing of 3.12 Å, which is the principal ("100") peak for sphalerite (ZnS). Both extremely small grain size and not-completely crystalline phases can cause the broad and diffuse X-ray diffraction peaks and both conditions may have prevailed with these precipitates.

Figure 2:
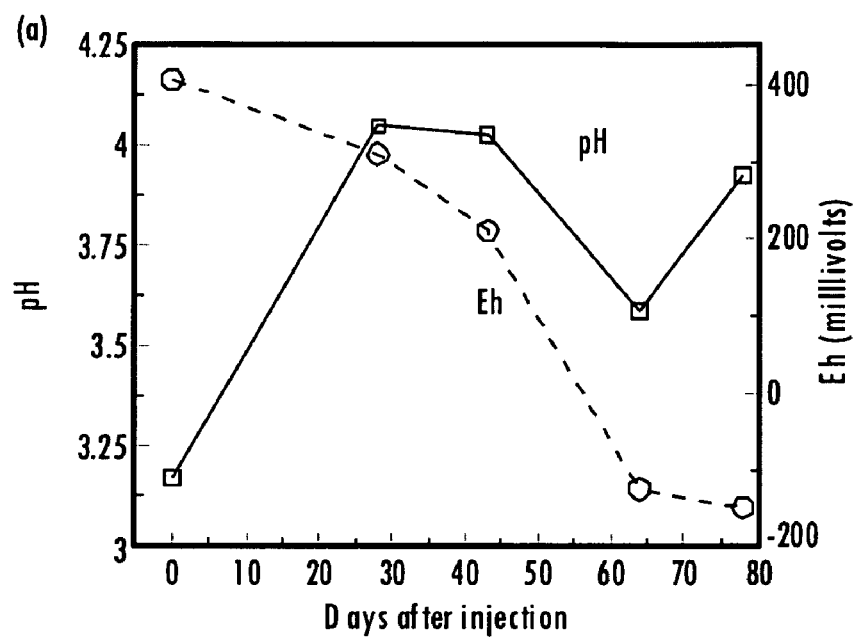
FIG. 2 shows graphs of changes in geochemical parameters resulting from an example form of the present invention.
Figure 2:
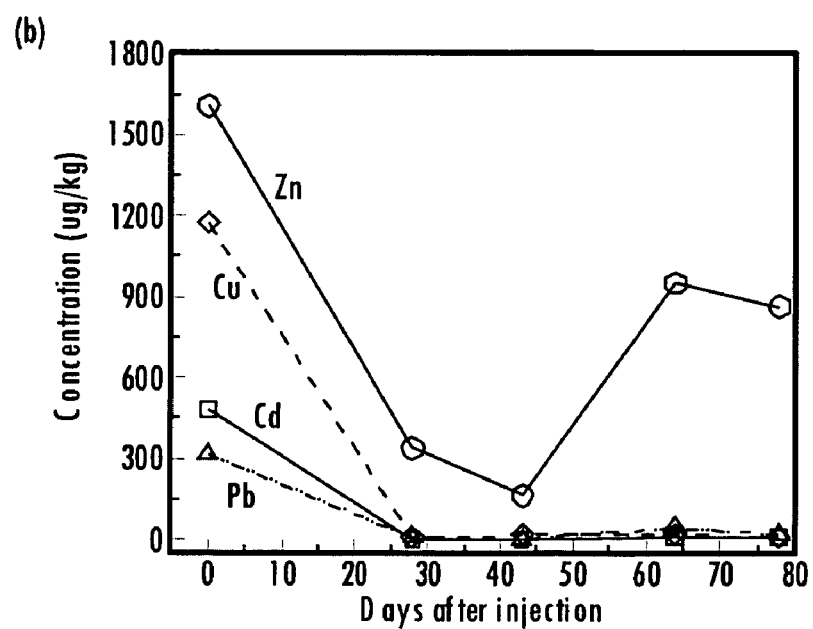
Figure 2:
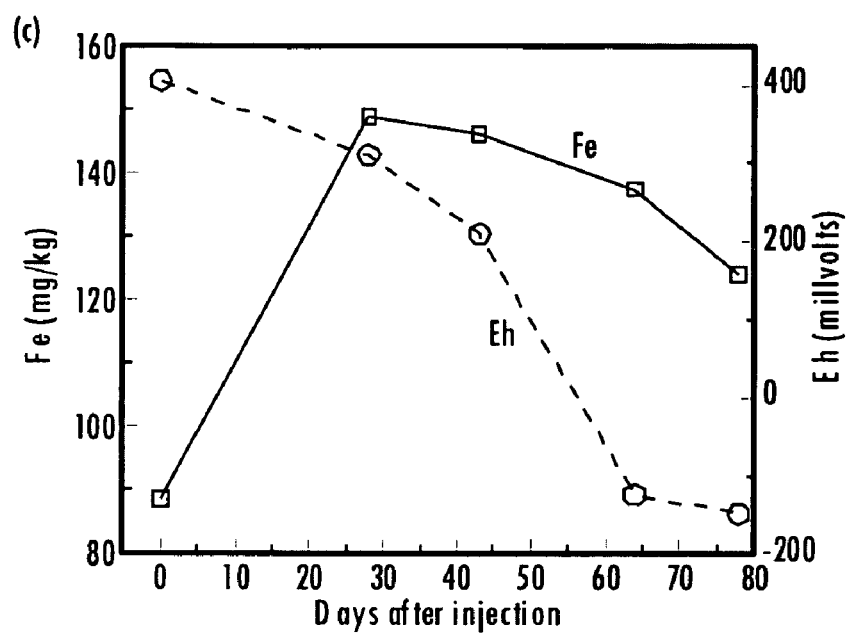
Figure 2:
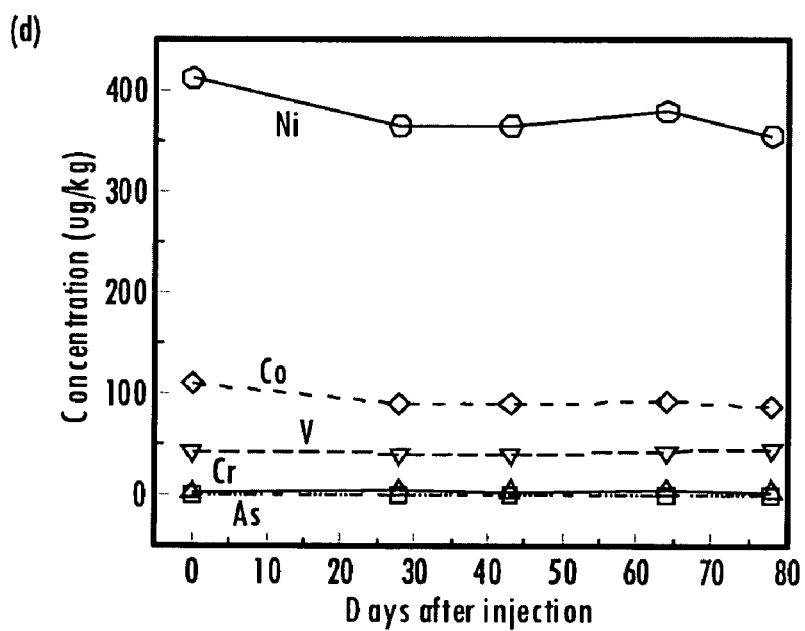
Figure 2:
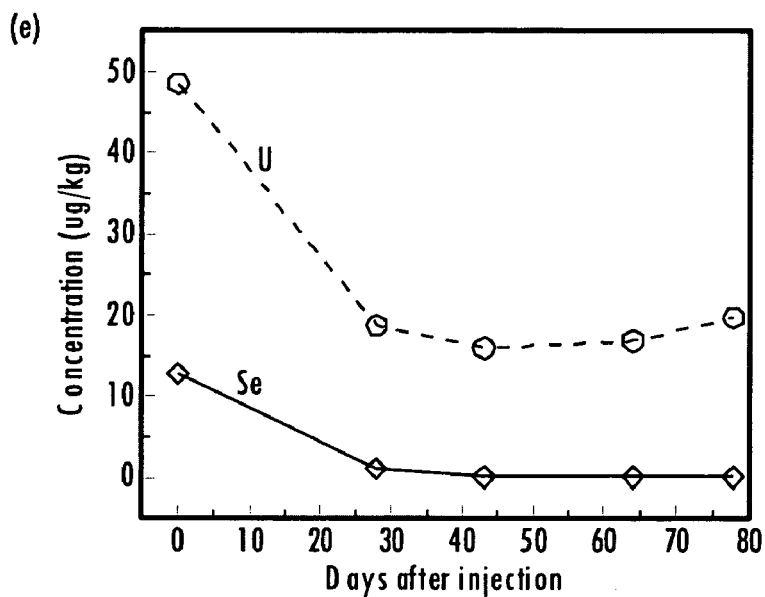
Figure 2:
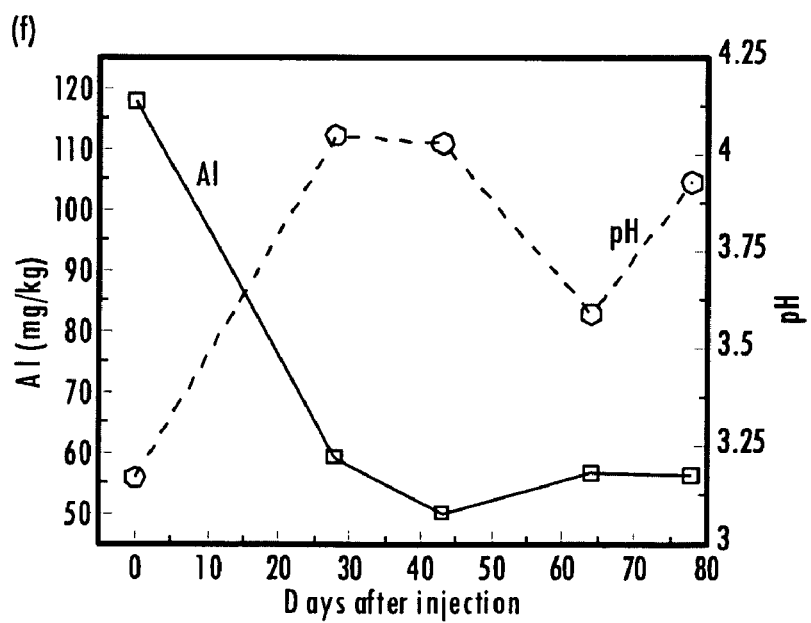

FIG. 2 shows observed changes in geochemical parameters with time after the injection of sucrose and diammonium phosphate solution, namely: (a) pH and Eh vs. time, (b) chalcophile elements (Zn, Cu, Cd, Pb) vs. time, (c) Fe and Eh vs. time, (d) siderophile elements (Ni, Co, V, Cr, As) vs. time, (e) redox-senstive elements (U, Se, Th) vs. time, and (f) Al and pH vs. time.

Concentration of iron increased significantly after injection of the CNP solution and did not drop to pre-injection levels during the course of the experiment (FIG. 2c). The iron increase, coupled with the moderately reducing conditions in the early stages of the experiment (FIG. 2a) indicates that the CNP solution initially stimulated indigenous iron reducing bacteria. The lack of a significant drop in iron concentration after bacterial sulfate reduction began indicates that iron was not precipitated as a sulfide phase.

Similarly, siderophile elements Co, Ni, and Cr showed no significant drop in concentration during the experiment (FIG. 2d). Arsenic concentrations were ~1 ppb in the baseline groundwater sample and also remained virtually unchanged, and, thus, are grouped with the siderophile elements.

In contrast, selenium (generally considered to behave similarly to arsenic) concentration dropped significantly (FIG. 2e). The abundance of lithophile elements (affinity for silicate melts or minerals) Cr and V also were little changed during the course of the experiment (FIG. 2d).

"Incompatible" lithophile elements uranium and thorium concentrations decreased significantly as the Eh values dropped during the course of the experiment (FIG. 2e). Similarly, Al concentration also dropped during the course of the experiment as a result of increasing pH.

Figure 3:
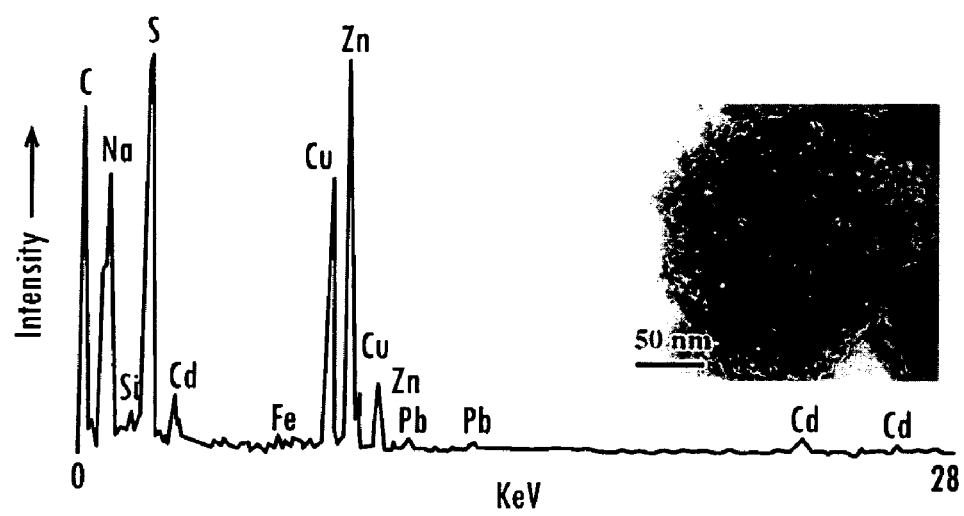
FIG. 3 shows energy dispersive X-ray (EDX) spectra of minerals formed from bacteria sulfate reduction according to an example form of the present invention and a TEM image of the aggregates of nanometer-scale microspherulites of these biominerals.

In the initial field experiment, Zn, Fe, Pb, and Cu sulfide phases were apparently formed and Cd was apparently incorporated into the ZnS crystal lattice. FIG. 3 shows energy dispersive X-ray (EDX) spectra of minerals formed from bacteria sulfate reduction. Also shown is the TEM image of the aggregates of nm-scale microspherulites (ZnS grains) of these "biominerals". The small grain size and aggregate texture indicate their high surface area and chemical reactivity. It is believed to be this small grain size and aggregate texture that imparts the chemical reactivity to these high-surface-area solid phases.

After bacterial sulfate reduction ceased, (apparently due to consumption of the organic carbon source by bacteria in groundwater), sulfate levels increased back to pre-injection levels and pH dropped. However, the principal contaminants of interest (lead, cadmium) only increased slightly, indicating that there was a residual affect on contaminant removal after biologic activity waned.

Accordingly, it can be seen that indigenous bacteria populations may be artificially stimulated to clean up groundwater around contaminated wells. Indigenous bacteria often live in microniches under "starvation" or extreme (e.g., highly acidic, anaerobic) conditions and can be "bred" to produce desired chemical changes in groundwater. Different types of bacteria, such as common groups of aerobes and anaerobes, have various capabilities to precipitate different types of biominerals in the aquifer to produce a subsurface mineral filter having specified characteristics. This subsurface mineral filter then has the capacity to remove contaminants by chemical reactions between contaminants and solid biomineral surfaces. Thus, this technology is analogous to a water filter in a water treatment plant or a residence, but surrounds the water well in the subsurface aquifer (i.e., an in situ groundwater filter). Because the system and method of the present invention do not require significant investment in tanks or mechanical parts (e.g., at the surface) and utilize readily available and generally low-cost chemical constituents, a low-cost water treatment process is enabled.

While the invention has been described with reference to preferred and example embodiments, it will be understood by those skilled in the art that a variety of modifications, additions and deletions are within the scope of the invention, as defined by the following claims.

What is claimed is:

1. A method of treating contaminated subsurface water to provide usable water, said method comprising:
    injecting a solution comprising at least one bacteria-stimulating component into a first portion of a subsurface region;
    introducing the solution comprising at least one bacteria-stimulating component to contact bacteria to produce biomineral precipitate within a second portion of the subsurface region; and
    drawing water through the second portion of the subsurface region in contact with the biomineral precipitate.

2. The method of claim 1, wherein the step of injecting a solution comprising at least one bacteria-stimulating component into a subsurface region comprises injecting the solution through a well into an aquifer to generate a subsurface water mound surrounding the well.

3. The method of claim 1, wherein the solution comprising at least one bacteria-stimulating component is introduced to bacteria indigenous to the subsurface region.

4. The method of claim 1, wherein the solution comprising at least one bacteria-stimulating component is introduced to metal-oxidizing bacteria.

5. The method of claim 1, wherein the solution comprising at least one bacteria-stimulating component is introduced to sulfate-reducing bacteria.

6. The method of claim 1, wherein the biomineral precipitate is a chemically-reactive, high surface-area precipitate.

7. The method of claim 6, wherein the chemically-reactive, high surface-area precipitate comprises aggregates of nanometer-scale microspherulites.

8. The method of claim 1, wherein the biomineral precipitate comprises a solid crystalline or amorphous oxide, hydroxide, sulfide or carbonate of a transition metal.

9. The method of claim 8, wherein the transition metal is iron or manganese.

10. The method of claim 1, further comprising removing process water from the subsurface region prior to drawing water through the subsurface region for contact with the biomineral precipitate.

11. The method of claim 1, further comprising characterizing an initial chemical and microbiological condition of the subsurface region.

12. The method of claim 1, wherein the solution comprising at least one bacteria-stimulating component comprises a solution of sucrose and diammonium phosphate.

13. A method of forming a subsurface mineral filtering zone within an aquifer, said method comprising injecting a bacteria-stimulating solution through a well into a first portion of the aquifer, and introducing the bacteria-stimulating solution to contact bacteria to generate production of a biomineral precipitate within a second portion of the aquifer.

14. The method of claim 13, further comprising introducing non-indigenous bacteria to the aquifer to generate production of the biomineral precipitate.

15. The method of claim 13, further comprising drawing water from a far-field portion of the aquifer into contact with the biomineral precipitate.

16. A method of treating contaminated groundwater comprising
   a) providing a composition capable of stimulating target microorganisms to produce biominerals, wherein at least a portion of the biominerals are capable of removing a contaminant from groundwater;
   b) injecting an effective amount of the composition of a) at an effective rate at a first location into a first subsurface region; and
   c) contacting the composition of a) with the target microorganisms under conditions effective for the microorganisms to produce the biominerals in a second subsurface region established apart from the first subsurface region; and
   d) moving groundwater comprising a contaminant through the biomineral-containing second subsurface region at a rate effective for the biominerals to remove at least a portion of the contaminants from the groundwater.

17. The method of claim 16, wherein moving groundwater of d) comprises withdrawing groundwater at a second location effective to move the groundwater through the biomineral-containing second subsurface region.

18. The method of claim 17, wherein the second location is downgradient of the contaminated groundwater.

19. The method of claim 17, wherein the first location is the same as the second location.

20. The method of claim 17, wherein the first location is different from the second location.

21. The method of claim 16, wherein the first subsurface region is not contaminated.

22. The method of claim 16, wherein the first subsurface region is contaminated.

23. The method of claim 16, wherein the second subsurface region is not initially contaminated.

24. The method of claim 16, wherein the second subsurface region is initially contaminated.

25. The method of claim 16, wherein the first subsurface region and the second subsurface region are the same subsurface region.

26. The method of claim 16, wherein the first subsurface region and the second subsurface region are different subsurface regions.

27. The method of claim 16, wherein the first location is downgradient of the contaminated groundwater.

28. The method of claim 16, wherein the target microorganisms are bacteria.

29. The method of claim 16, wherein the target microorganisms are metal-oxidizing and/or sulfate-reducing bacteria.

30. The method of claim 16, wherein the target microorganisms are indigenous to the subsurface region.

31. The method of claim 16, wherein the target microorganisms are added to the subsurface region.

32. The method of claim 16, further comprising formulating the composition of a) wherein formulating comprises
   i) determining a first formulation capable of supporting metabolism of the target microorganisms but emphasizing desired production of minerals as opposed to growth and
   ii) adjusting and/or adding ingredients in the first formulation to account for the chemistry of the region.

33. The method of claim 16, wherein the composition is a solution.

34. The method of claim 16, wherein the composition comprises an electron donor and an electron acceptor.

35. The method of claim 16, wherein the composition comprises a carbon source and an electron acceptor.

36. The method of claim 16, wherein the composition comprises sucrose and diammonium phosphate.

37. The method of claim 34, wherein the composition further comprises nutrients.

38. The method of claim 16, wherein the composition comprises soluble iron.

39. The method of claim 16, wherein the composition comprises manganese salt.

40. The method of claim 16, further comprising chemically and/or microbiologically characterizing the first subsurface region.

41. The method of claim 16, further comprising chemically and/or microbiologically characterizing the second subsurface region.

42. The method of claim 16, wherein the biominerals are a solid crystalline or amorphous oxide, hydroxide, sulfide, or carbonate of a transition metal, or mixtures thereof.

43. The method of claim 42, wherein the transition metal is iron or manganese.

44. The method of claim 16, wherein the contaminant is a toxic heavy metal, toxic metalloid, and/or chlorinated hydrocarbon capable of reductive dehalogenation.

45. The method of claim 16, wherein injecting at an effective rate into a subsurface region is an injection rate which induces mounding leading to radial flow of the composition at the first location.

46. The method of claim 16, wherein the removal of d) is via adsorption, absorption, co-precipitation, and/or chemical reaction.

47. The method of claim 16, wherein the produced biominerals comprise high surface area particles.

48. The method of claim 47, wherein the high surface area particles are nanometer-scale microspherullites.

49. The method of claim 16, wherein the removal of contaminant in step d) produces potable groundwater.

50. The method of claim 16, wherein the removal of contaminant in step d) produces groundwater suitable for agricultural purposes.

51. The method of claim 16, wherein the removal of contaminant in step d) produces groundwater suitable for industrial purposes.

52. A method of removing target contaminants from groundwater comprising
   a) providing a composition capable of stimulating target microorganisms to produce biominerals, wherein at least a portion of the biominerals are capable of removing a target contaminant from groundwater;
   b) injecting an effective amount of the composition of a) at an effective rate at a first location into a first subsurface region; and
   c) contacting the composition of a) with the target microorganisms under conditions effective for the microorganisms to produce the biominerals in a second subsurface region, established apart from the first subsurface region; and
   d) moving groundwater comprising a target contaminant through the biomineral-containing second subsurface region at a rate effective for the biominerals to remove at least a portion of the target contaminant from the groundwater.

53. A method of forming a subsurface groundwater filtration zone comprising
   a) providing a composition capable of stimulating target microorganisms to produce biominerals, wherein at least a portion of the biominerals are capable of removing a contaminant from groundwater;
   b) injecting an effective amount of the composition of a) at an effective rate at a first location into a first subsurface region; and
   c) contacting the composition of a) with the target microorganisms under conditions effective for the microorganisms to produce the biominerals in a second subsurface region thereby forming a groundwater filtration zone, established apart from the first subsurface region.

\* \* \* \* \*

UNITED STATES PATENT AND TRADEMARK OFFICE
CERTIFICATE OF CORRECTION

PATENT NO. : 7,341,664 B2  Page 1 of 1
APPLICATION NO. : 10/865572
DATED : March 11, 2008
INVENTOR(S) : Ming-Kuo Lee, James A. Saunders and Samuel H. Nichols, III It is certified that error appears in the above-identified patent and that said Letters Patent is hereby corrected as shown below:

IN THE SPECIFICATION
At column 9, line 22, please replace "$Fe+^2$" with -- $Fe^{+2}$ --.

IN THE CLAIMS
At column 13, line 43, Claim 16, please delete "and" after ";".

At column 13, line 47, Claim 16, please add -- , -- between "region" and "established".

Signed and Sealed this

Seventeenth Day of June, 2008

JON W. DUDAS
*Director of the United States Patent and Trademark Office*